United States Patent [19]

Valkestijn

[11] 3,914,652

[45] Oct. 21, 1975

[54] COLOR TELEVISION DISPLAY APPARATUS PROVIDED WITH A MODULATOR FOR GENERATING A CORRECTION CURRENT FOR CORRECTING DEFLECTION ERRORS

[75] Inventor: Leonardus Albertus Antonius Valkestijn, Eindhoven, Netherlands

[73] Assignee: U.S. Philips Corporation, New York, N.Y.

[22] Filed: Feb. 8, 1974

[21] Appl. No.: 440,716

Related U.S. Application Data

[63] Continuation of Ser. No. 300,455, Oct. 25, 1972, abandoned.

[30] Foreign Application Priority Data

Nov. 17, 1971 Netherlands .................... 7115868

[52] U.S. Cl. .................................... 315/371

[51] Int. Cl.$^2$ .................................... H01J 29/56

[58] Field of Search ................ 315/371, 370, 13 C

[56] References Cited

UNITED STATES PATENTS

| | | | |
|---|---|---|---|
| 3,440,483 | 4/1969 | Kaashoek et al. | 315/370 |
| 3,566,181 | 2/1971 | Figlewicz | 315/371 |
| 3,714,500 | 1/1973 | Kaashoek | 315/370 |

*Primary Examiner*—Maynard R. Wilbur
*Assistant Examiner*—G. E. Montone
*Attorney, Agent, or Firm*—Frank R. Trifari; Henry I. Steckler

[57] ABSTRACT

Color television display apparatus in which the modulator for generating a difference current for correcting astigmatic deflection errors applied to at least one deflection coil is also connected through a selective network and an integrator to the field deflection coil in order to perform the North-South raster correction. The modulator may be also used for improving the blue lateral convergence. In one embodiment the modulator is provided with a transductor.

9 Claims, 9 Drawing Figures

Figures 1, 2:
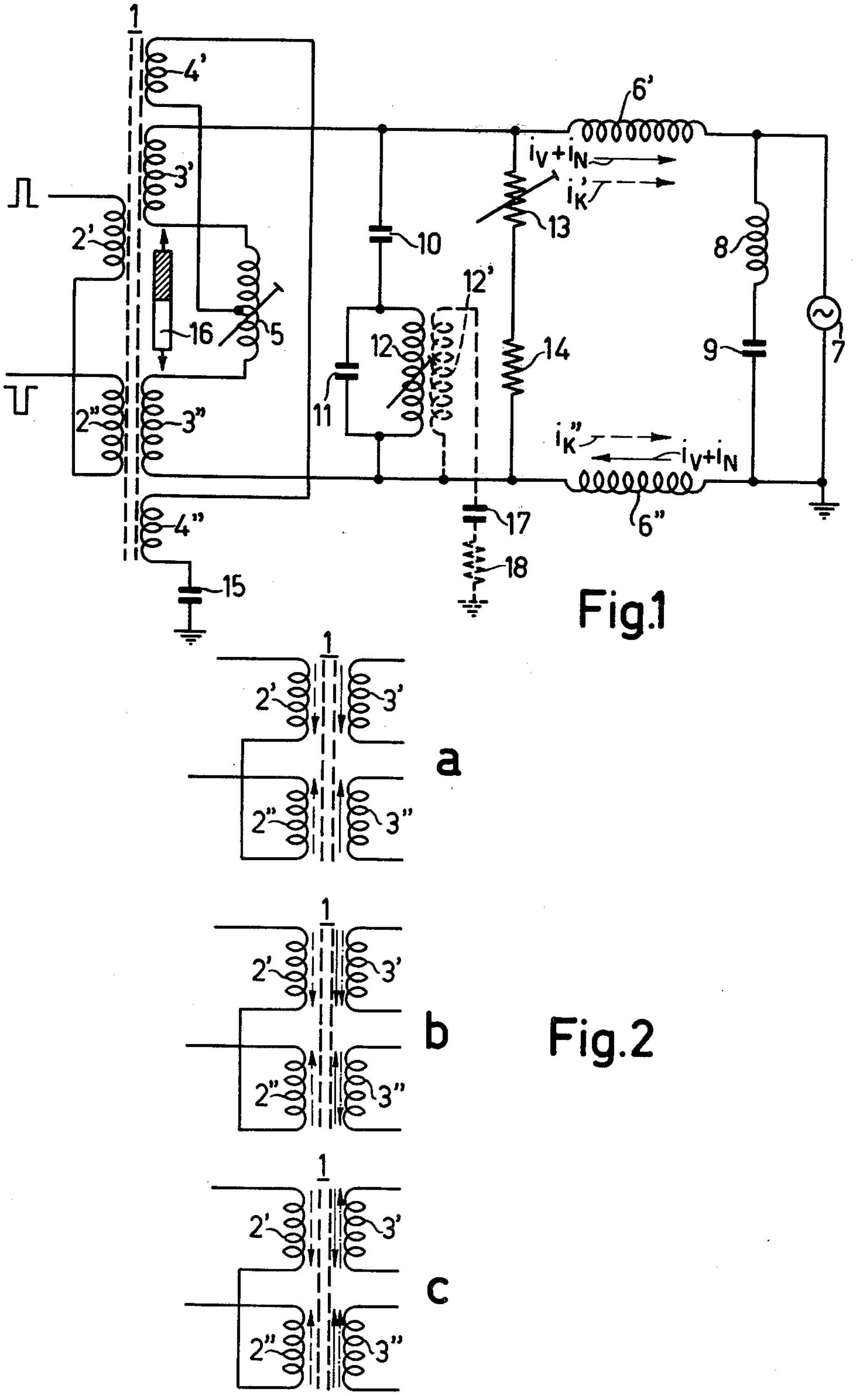

COLOR TELEVISION DISPLAY APPARATUS PROVIDED WITH A MODULATOR FOR GENERATING A CORRECTION CURRENT FOR CORRECTING DEFLECTION ERRORS

This is a continuation of application Ser. No. 300,455, filed Oct. 25, 1972.

The invention relates to colour television display apparatus provided with a picture display tube, a line and a field deflection current generator for applying a substantially sawtooth current of line and field frequency having a substantially constant peak-to-peak amplitude to a line and a field deflection coil, a raster correction circuit for correcting the geometrical properties of the displayed picture and a modulator for generating a correction current for correcting astigmatic deflection errors, which current is applied to at least one deflection coil.

U.S. Pat. No. 3,440,483 describes an arrangement of this kind in which the correction current generated by the modulator, the so-called difference current, is at the line frequency and undergone a field frequency amplitude variation and is superimposed on the deflection current flowing in the line and/or field deflection coil. The deflection coil is divided into two substantially symmetrical coil halves provided on either side of the neck of the display tube, and the difference current is added to the deflection current in one coil half and subtracted from the deflection current in the other coil half. This known arrangement also includes a generator for performing the East-West raster correction, i.e. the correction in the horizontal direction of the geometrical properties of the displayed picture. This generator and the modulator for the difference current can be combined by using two premagnetized transducers, but this is only possible if the difference current is applied to the line deflection coil halves.

The present invention has for its object to provide a combined circuit arrangement of this kind in which, however, not the East-West raster correction but the North-South raster correction, i.e. in the vertical direction, is performed. In order to realize this the arrangement according to the invention is characterized in that for the purpose of the North-South raster correction the modulator is connected through aa selective network and an integrator to the field deflection coil.

It is true that a North-South raster correction circuit of this kind is known per se. A combination thereof with the difference current modulator as in the invention is, however, not known and this combination has the additional advantage that it is suitable irrespective of the fact to which deflection coil the difference current is applied.

The modulator for generating the difference current thus acquires a second function. The description will show that it may likewise perform other functions such as the supply of a signal for the purpose of the blue lateral convergence. As a result a versatile element is available and a large number of components is economized.

Figure 3:
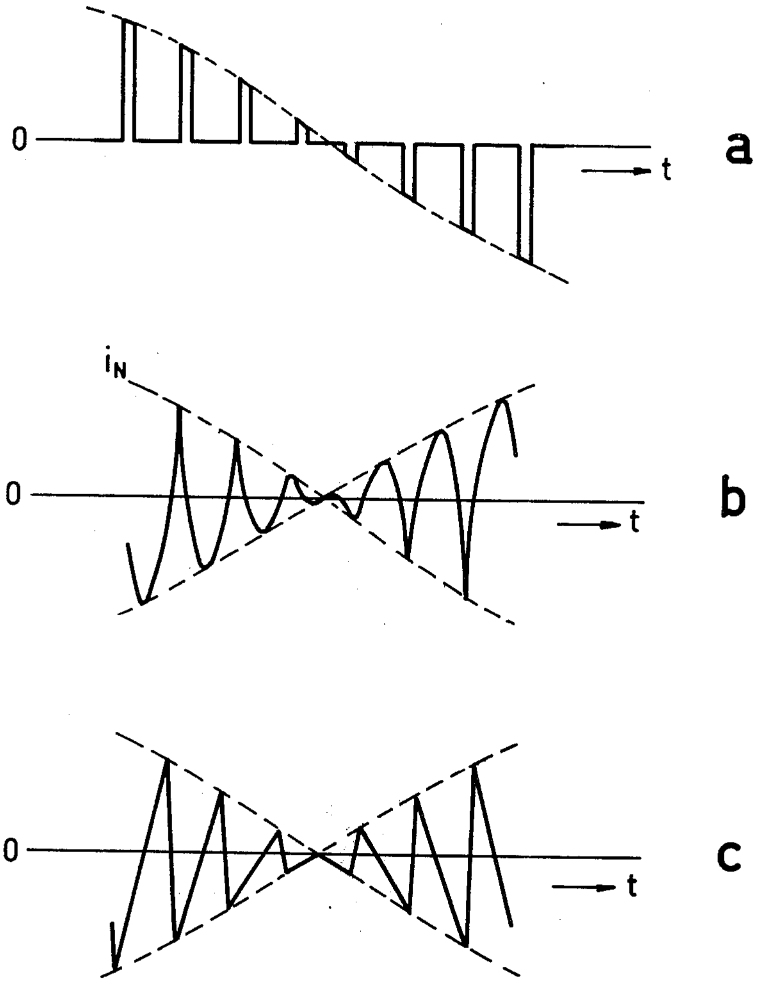
Figure 4:
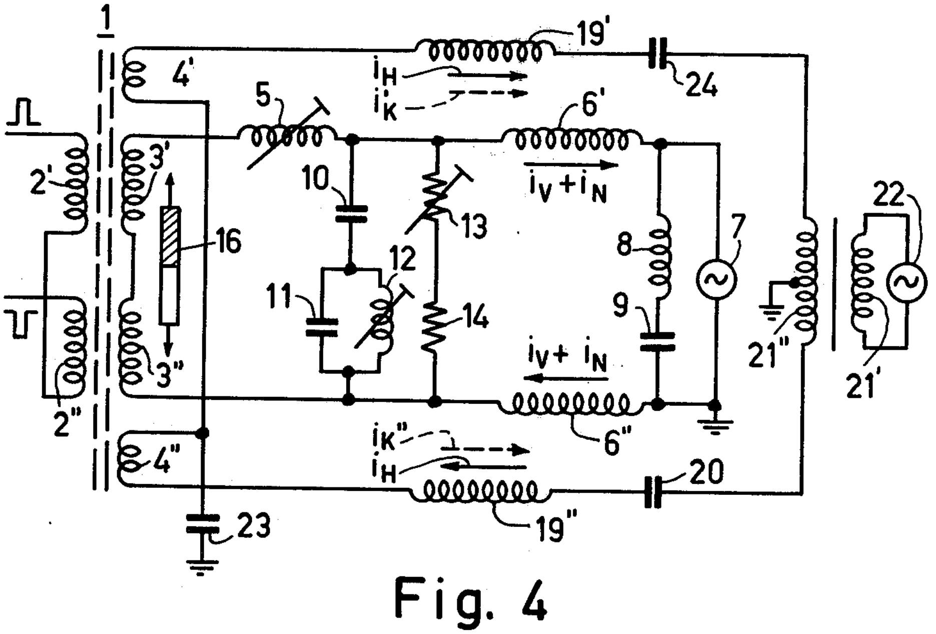
Figure 5:
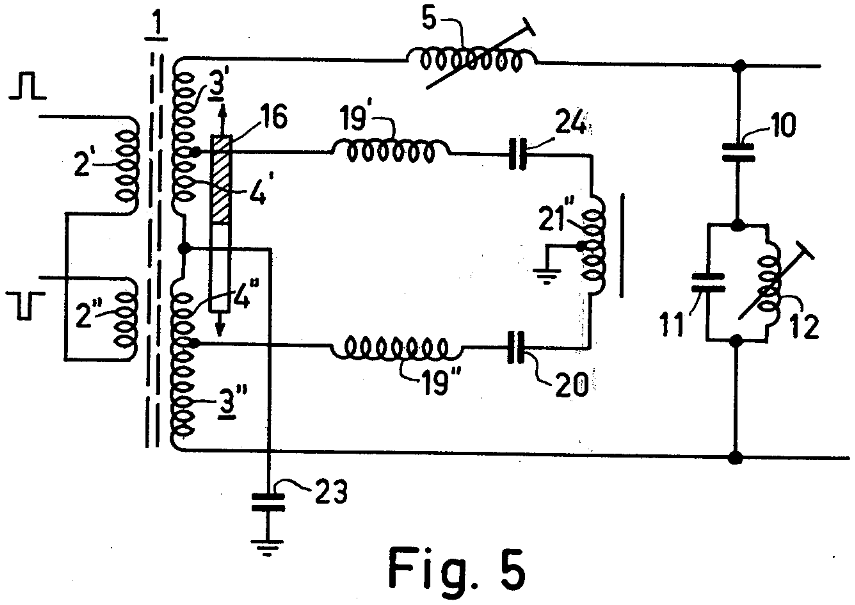
Figures 6, 7:
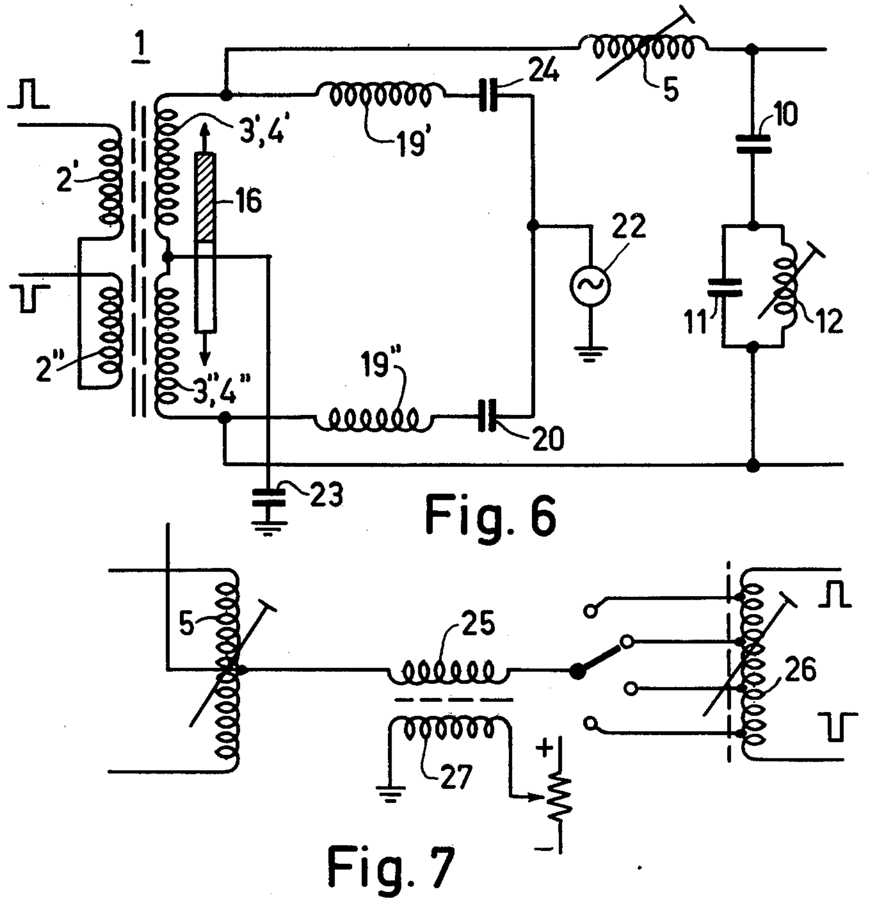
Figure 8:
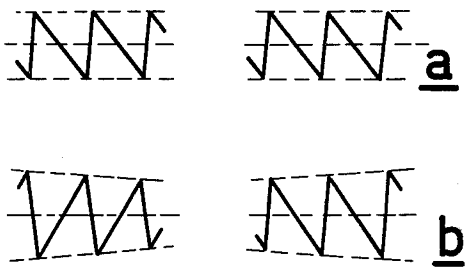
Figure 9:
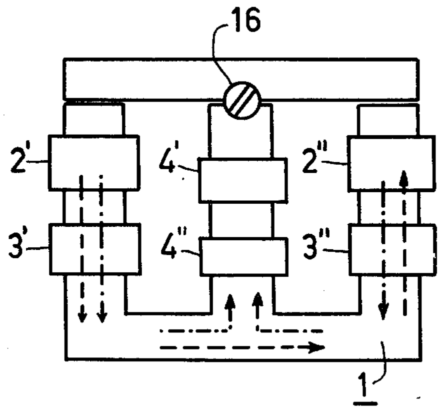

The invention will be described in detail by way of example with reference to the accompanying Figures in which:

FIG. 1 shows a circuit diagram of an embodiment of the arrangement according to the invention, FIG. 2 shows the variation of magnetic fields present in the arrangement according to FIG. 1, FIG. 3 shows waveforms occurring in the arrangement according to FIG. 1, FIGS. 4, 5, 6 and 7 show circuit diagrams of further embodiments of the arrangement according to the invention, FIG. 8 shows current waveforms occurring in the embodiment according to FIG. 7, and FIG. 9 shows a possible embodiment of an element of the arrangement according to the invention.

In FIG. 1, 1 is a transductor with which the North-South raster correction in colour television display apparatus (not further shown) is performed. Transducer 1 consists of, for example, a rod-shaped core of magnetic material having permanent magnets secured to either end which premagnetise the core in such a manner that two similar poles are produced at the ends. A primary and a secondary winding are wound on the core which are both divided into two partial windings 2′ and 2″ and 3′, 3″ which have substantially the same number of turns. The partial windings, for example 2′ and 2″, of a winding are wound in the opposite sense relative to each other while the partial windings, for example 3′ and 3″, of the other winding are wound in the same sense.

Partial windings 2′ and 2″ receive line flyback pulses of opposite polarity and substantially equal amplitude and this in such a manner that in the absence of current in the secondary winding the induction fields induced in the core have the same directions as the fields generated by the permanent magnets and therefore eliminate each other. This is shown in greater detail in FIG. 2*a* in which the solid-line arrows indicate the direction of the premagnetisation fields and the brokenline arrows indicate the direction of the fields induced by partial windings 2′ a nd 2″.

Furthermore a tertiary winding divided into two substantially equal partial windings 4′ and 4″ is wound on the core of transducer 1 at the area of secondary winding 3′, 3″. An adjustable inductor 5 is arranged in series between partial windings 3′ and 3″ and its central tap is connected to partial winding 4′. At the other end partial windings 3′ and 3″ are connected to the field deflection coil halves 6′ and 6″, respectively, which are each connected to a terminal of the field deflection current generator 7 while a terminal of generator 7 is connected to earth. In the arrangement according to FIG. 1 coil halves 6′ and 6″ are arranged in series both for the field deflection current $i_v$ provided by generator 7 and with partial windings 3′ and 3″.

A series network of an inductor 8 and a capacitor 9 tuned to the line frequency is arranged in parallel with generator 7. The series arrangement of a capacitor 10 and an LC parallel network 11, 12 is arrangement between the junction of partial winding 3′ and coil half 6′ and that of partial winding 3″ and coil half 6″. Inductor 5 and inductor 12 in the said parallel network are adjusted in such a manner that the entire circuit arrangement of FIG. 1, including the windings of the line transformer not shown to which partial windings 2′ and 2″ are connected, has one parallel resonance at the line frequency and one at twice this frequency while those resonances are mainly determined by the values of the elements of the selective network 5, 10, 11, 12. The inductance of inductor 5 is namely many times larger than that of winding 3′, 3″. Network 8, 9 constitutes a short circuit for the line frequency while the impedance of coil halves 6′ and 6″ for the field frequency is much higher than the other impedances of the circuit arrangement. Generator 7 and the NorthSouth correction circuit thus cannot substantially influence each other. Series arrangement 10, 11, 12 is shunted by the series arrangement of an adjustable resistor 13 and a fixed resistor 14. The end of winding 4′ remote from inductor 5 is connected in series with partial winding 4″ and a capacitor 15, which capacitor has a low impedance for the line frequency and a high impedance for the field frequency and the other end of which is connected to earth.

When field deflection current $_v$ flows, the induction field induced in one half of the core increases during the first half of the field scan period while the field strength in the other half of the core is reduced. This is shown in FIG. 2*b* in which the field frequency fields are indicated by chainlink line arrows. The first-mentioned half of the core shown in the upper part of FIG. 2 is saturated. Line frequency voltage pulses are only induced in partial winding 3″. They exhibit a field frequency amplitude variation in which the amplitude is maximum at the beginning and zero in the middle of the field scan period. These pulses are positively directed due to the chosen winding sense of partial winding 3′. The foregoing applies when elements 10, 11, 12 and 4′, 4″ and 15 are considered to be omitted so that the central tap of inductor 5 conveys a potential of zero.

During the second half of the field scan period field deflection current $i_V$ is reversed in direction so that the core half shown in the lower part of FIG. 2 is saturated. Thus, negatively directed line flyback pulses having a maximum at the end of the field scan period are produced across partial winding 3′. The voltage available for some line periods on either side of the central horizontal line across the secondary winding 3′, 3″ in the absence of series arrangement 10, 11, 12 is shown (exaggerated) in FIG. 3a. It may be noted that the field frequency envelope thereof is not exactly linear but S-shaped. This is caused by the fact that the field deflection current does not vary exactly linearly but is "S-corrected". This effect is accentuated because the BH-curve of the magnetic material of the core is not linear. Practice has proved that such an evelope may indeed be desirable.

Due to the selective character of elements 5, 10, 11, 12 the voltage shown in FIG. 3*a* is not produced across secondary winding 3′, 3″ but a voltage which is the sum of two sinusoidal voltages, one of the line frequency and one of twice the value thereof, while its field frequency envelope is symmetrical relative to the earth potential. Thus, a current $i_N$ is superimposed on the field deflection current flowing through coil halves 6′ and 6″ which current undergone the same field frequency amplitude variation and which is the sum of two cosine-shaped currents of the said frequencies having their maxima in the middle of the line scan period. The path through which these currents flow is in fact substantially purely inductive. As is known the resultant current $i_N$ (FIG. 3*b*) has the substantially parabola shape which is desirable for the NorthSouth raster correction.

An adjustment is possible by means of a rotatable symmetry magnet 16 provided at the area of the centre of the core while the central tap of inductor 5 actually conveys the earth potential in the absence of series arrangement 4′, 4″ 15. As a result the zero transition point of the voltage in FIG. 3*b* is adjusted (= the correction for the central horizontal line on the screen of the display tube). The phase and the amplitude of North-South correction current $i_N$ are adjusted by means of inductor 5 and resistor 13.

A voltage which is equal in shape to the voltage across partial winding 3′ is produced across partial winding 4′, while a voltage which is equal in shape to that across partial winding 3″ is produced across partial winding 4″, in both cases in the absence of network 10, 11, 12. Consequently a voltage which is equal in shape to that in FIG. 3*a* is produced across the series arrangement of partial windings 4′ and 4″. Two substantially equal currents flow from the central tap of inductor 5, one through partial winding 3′ and coil half 6′ to earth, the other through partial winding 3″ and coil half 6″ to earth. One of these currents, $i'_R$, flows in the same direction as field deflection current $i_V$, while the other current, $i''_K$, flows in the direction opposite thereto. Series arrangement 4′, 4″, 15 thus generates a difference current. The line frequency variation of currents $i'_K$ and $i''_K$ is substantially sawtooth-shaped. Due, to the symmetry of the circuit arrangement the difference current is substantially not influenced by the selective network 5, 10, 11, 12, while currents $i_V$ and $i_N$ are substantially not influenced due to the presence of series arrangement 4′, 4″, 15. Since capacitor 15 does not pass the direct current component, currents $i'_K$ and $i''_K$ are zero in the centre of each line period so that the field frequency envelope thereof is equal in shape to that of FIG. 3*b*, i.e. symmetrical relative to the earth potential (see FIG. 3*c*). The intensity thereof is therefore a function of the product of the instantaneous intensity of the line and field deflection currents.

U.S. Pat. No. 3,440,483 mentioned hereinbefore shows that under these circumstances a magnetic quadripolar field is generated by coil halves 6′, 6″ which eliminates anisotropic astigmatic deflection errors. The exact correction in a given picture display tube and a given deflection unit is obtained by choosing the suitable number of turns for partial windings 4′ and 4″ relative to the number of turns of partial windings 3′ and 3″. In this manner transducer 1 has acquired a dual function, for it operates as a difference current generator and as a North-South raster correction circuit.

It is to be noted that coil halves 6′ and 6″ behave as an integration element both for current $i_V$ and for currents $i'_K$ and $i''_K$. This is only possible on the condition that the ratio between the inductance and the resistive value thereof is high. If this ratio is low, an integrator must be available, for example, an inductor of high value which is arranged in series with coil halves 6′ and 6″ and whose resistive value is too low to be able to influence current $i_V$.

U.S. Pat. application 248,091, filed May 27, 1972, now U.S. Pat. No. 3,803,444 and Netherlands application Ser. No. 710,922) propose to correct convergence residual errors which occur when using deflection coils substantially without anisotropic astigmatism by means of network forming part of the North-South raster correction circuit. This network is shown in broken lines in FIG. 1 and consists of, for example, the series arrangement of a winding 12′ coupled to inductor 12, a capacitor 17 and a resistor 18. In principle network 12′, 17, 18 cannot simultaneously be used as series arrangement 4′, 4″, 15 because the said series arrangement is intended to eliminate anisotropic astigmatic errors. However, practice has proved that deflection coils substantially without anisotropic astigmatism still introduce a small error in the corners of the displayed picture, which error may be considered as an anisotropic astigmatic error and therefore can be eliminated by the series arrangement 4', 4'', 15, although in that case partial windings 4' and 4'' need only have a small number of turns. As a result the circuit arrangement according to FIG. 1 performs three functions.

It has been stated in the U.S. Pat. referred to hereinbefore that the correction quadripolar field may alternatively be generated by the line deflection coil halves if a difference current flows through these coil halves. The circuit arrangement according to the invention may therefore be formed as is shown in FIG. 4. In this Figure the series arrangement of partial windings 4' and 4'' is arranged in series with the line deflection coils 19' and 19'' which are connected at the other end through a capacitor 20 for the S-correction and the secondary winding 21'' of a transformer. The line deflection current generator 22 is connected to the primary winding 21' of this transformer. The central tap of winding 21'' is connected to earth, while the junction of partial windings 4' and 4'' is connected to earth, for example, through a capacitor 23. Capacitor 23 may be advantageously chosen to be such that, together with the anti-parallel arranged coil halves 19' and 19'', it constitutes a circuit having a resonant frequency which is the line frequency. Anti-parallel is to be understood to mean that the inductance of the system 19', 19'' is measured from the junction of partial windings 4' and 4''. In this manner two substantially equal currents flow from the said point which have the shape shown in FIG. 3c. One current, $i'_K$, flows through partial winding 4', coil half 19' and half the winding 21'' shown in the upper part of FIG. 4 to earth and is added to the line deflection current $i_H$. The other current, $i''_K$, flows through partial winding 4'', coil half 19'' and half the winding 21'' shown in the lower part of FIG. 4 to earth and is subtracted from current $i_H$. The impedance of the path for the two currents is low as a result of the choice of capacitor 23. Coil halves 19' and 19'' thus generate the desired correction quadripolar field. Since the North-South circuit in this embodiment need not be symmetrical, elements 5, 10, 11, 12 may be arranged as is shown in FIG. 4. In order to block the DC-component a capacitor 24 must be present. Capacitors 20 and 24 may be proportioned in such a manner that they jointly constitute the capacitor for the S-correction of the line deflection.

FIG. 5 shows a modification of the circuit arrangement of FIG. 4. In this Figure secondary windings 3', 3'' and tertiary windings 4', 4'' constitute a single winding having taps. Partial windings 4' and 4'' form part of partial windings 3' and 3'' and are located between the junction of partial windings 3' and 3'' and a tap thereof. A further simplification may be obtained if the voltages required for the two corrections may be equal, for example, because the North-South correction current is adjustable by means of resistor 13. In such a case the taps on the aforementioned winding may be omitted.

It is to be noted that in the described modifications the zero transitions in the middle of the field scan period of the difference current and of the North-South raster correction current must substantially coincide so that the two corrections are zero for the central horizontal line. This may be obtained by the adjustment of the permanent magnets at both ends of the core and/or symmetry magnet 16.

In the arrangements according to FIGS. 1, 4 and 5 the deflection coil halves for the deflection current are arranged in series. It will be evident that they may alternatively be arranged in parallel. FIG. 6 shows an arrangement according to the invention in which line deflection coil halves 19' and 19'' are arranged in parallel for the line deflection current and in which also windings 3', 3'' ensure both the North-South correction and the difference current. In order that the quadripolar field generated by coil halves 19' and 19'' is symmetrical, the arrangement must comprise at least one balance inductor. One end of coil half 19' and one end of coil half 19'' are connected together in FIG. 6 while the two other ends are connected through the said balance inductor. Secondary winding 3', 3'' may then function as a balance inductor so that the arrangement according to the invention acquires a fourth function. The junction of partial windings 3' and 3'' may be connected to earth for the line frequency as is the case in FIGS. 4 and 5 by using capacitor 23. As a result the tap of the balance inductor is also connected to earth. In the arrangement according to FIG. 6 capacitors 20 and 24 block the DC component while capacitor 23 may be the S-capacitor or may be replaced by a short circuit.

U.S. Pat. No. 3,748,531 states that when the astigmatic error to be corrected is large, the linear approximation during the line scan of the difference current is insufficient. A third-degree term has to be present which can be realized by the interposition of an LC parallel circuit whose resonant frequency is between the line frequency and double the value thereof. This may be realized with the arrangement according to the invention, such a circuit being included in series with the series arrangement 4', 4'', 15 or with capacitor 23, operating as a difference current generator.

The arrangement according to the invention may perform a fifth function. In shadow mask tubes having a large deflection angle it has been proved that the raster distortion of the displayed picture is larger for blue than for the other two colours red and green. When all correction circuits are adjusted in such a manner that all three electron beams coincide along the two axes and along the upper and lower edges of the picture, a blue trapiezium-shaped distortion is found to remain. The sides of the picture are shown as two oblique straight lines for blue, while the upper edge is generally longer than the lower edge. This error is caused because the "blue" electron gun is vertically placed more eccentrically than the "green" and the "red" gun. Steps to eliminate this error are known, for example, a field frequency modulation of the current through the coil for adjusting the so-called dynamic blue lateral convergence, i.e. the convergence in the horizontal direction elsewhere than in the centre of the displayed picture. Due to the arrangement according to the invention the relevant modulator may be omitted as will now be further explained.

FIG. 7 shows the coil 23 for the dynamite blue lateral convergence. One end thereof is connected to an adjustable tap of winding 26 whose ends receive line flyback pulses of opposite polarity so that a line frequency sawtooth current of constant peak-to-peak amplitude such as, for example, in FIG. 8a flows through coil 25.

The other end of coil 25 in the left-hand part of FIG. 7, is connected in known arrangements to the output of an amplifier which follows the above-mentioned modulator. The coil 27 for the static blue lateral convergence, i.e. for the adjustment of blue in the horizontal direction in the centre of the picture is wound on the same core of magnetic material as the one on which coil 25 is wound. A direct current whose polarity and intensity are adjustable flows through coil 27.

According to one aspect of the invention the left end of coil 25 in FIG. 7 is connected to the central tap of inductor 5 in FIG. 1 or to the junction of partial windings 4', 4'' in FIGS. 4 and 5 or 3', 3'' in FIG. 6, respectively. As a result a sawtooth current having a substantially linear field frequency amplitude variation (FIGS. 3*c* and 8*b*) flows through coil 25. The current flowing thrugh coil 25 is the sum of the currents which are shown in FIGS. 8*a* and 8*b* in which on the left-hand side two line periods are shown in the first half of the field scan period and on the right-hand side two line periods are shown in the second half of the field scan period. This Figure shows that the "blue" line deflection is reduced in the first half and is increased in the second half of the field scan period. An adjustment of the tap of winding 26 can be found in which the trapezium-shaped distortion is largely corrected. When the "blue" line deflection is to be increased only during the first half of the field scan period without influencing it during the second half, the left end of coil 25 in FIG. 7 is to be connected to the junction of partial windings 4' and 4'' in FIG. 1 or to the junction of partial windings 4'' and 3'' and coil half 19'' in FIGS. 4, 5 and 6, respectively. On the other hand, to influence the "blue" line deflection during the second half of the field scan period the same step may be taken in which, however, partial windings 4' and 4'' and 3'' and 3'' are exchanged which has no influence for the other circuits.

Although the core of tranducer 1 has been assumed to be rod-shaped, other known shapes may alternatively be used. In, for example, an E-shaped core, partial windings 2' and 3' in FIG. 1 are wound on an outer limb while partial windings 2'' and 3'' are wound on the other outer limb and partial windings 4' and 4'' are wound on the central limb. The winding senses are chosen to be such that the magnetic fluxes generated by partial windings 2' and 2'' circulate in the outer limbs so that substantially no line frequency flux passes through the central limb, while the fluxes generated by partial windings 3' and 3'' counteract each other in the outer limbs. Reference is made to FIG. 9 in which a situation is shown which corresponds to that of FIG. 2*b*, i.e. during the first half of the field scan period. The left outer limb is saturated. Only the field frequency flux is present in the central limb. This construction has the advantage that the coupling between partial windings 2' and 3'' and 2'' and 3'' is large while also the leakage inductance of partial windings 3', 3'', 4' and 4'' is small. The foregoing applies to the embodiments according to FIGS. 1 and 4. For those of FIGS. 5 and 6 all windings are wound on the outer limbs while the central limb provides a path of low permeability for the North-South field. As a result the coupling is still larger and the leakage inductance is still smaller. This step is alternatively possible for the embodiments of FIGS. 1 and 4.

For performing the North-South raster correction and/or of the modulator for the difference current so-called active circuits are known which are equipped with, for example, transistors instead of a transductor. It will be evident that the step according to the invention may also be used in such a case.

What is claimed is:

1. Color television display apparatus provided with a picture display tube, a line and a field deflection current generator for applying a substantially sawtooth current of line and field frequency having a substantially constant peak-to-peak amplitude to a line and a field deflection coil, a raster correction circuit for correcting the geometrical properties of the displayed picture and a modulator for generating a correction current for correcting astigmatic deflection errors, which current is applied to at least one deflection coil, characterized in that for the purpose of the North-South raster correction the modulator is connected through a selective network and an integrator to the field deflection coil.

2. Television display apparatus as claimed in claim 1, in which the modulator is provided with a premagnetised transductor on which a modulator winding and a winding for applying line frequency signals are wound, characterized in that a winding for the North-South raster correction is wound on the transductor, which winding is connected through a selective network and an integrator to the field deflection coil.

3. Television display apparatus as claimed in claim 1, in which the modulator is provided with a premagnetised transductor on which a modulator winding and a winding for applying line frequency signals are wound, characterized in that the modulator winding is connected through a selective network and an integrator to the field deflection coil.

4. Television display apparatus as claimed in claim 1, comprising a coil for laterally displacing one of the electron beams present in the display tube, characterized in that the said coil is connected to the modulator.

5. Television display apparatus as claimed in claim 4 wherein said modulator comprises a premagnetized transductor having modulator and line frequency windings, a line frequency current having an adjustable amplitude flows through the coil, characterized in that one end of the coil is connected to one point of the modulator winding.

6. Television display apparatus as claimed in claim 2 in which the modulator provides the correction current for the line deflection coil which is divided into two substantially symmetrical coil halves which are arranged in parallel for the line deflection current through a balance windin, characterized in that the winding for the North-South raster correction is the balance winding.

7. Television display apparatus as claimed in claim 1, wherein said modulator comprises a transductor having a plurality of windings, and in which the core of the transductor comprises a central limb and two outer limbs, characterized in that all said windings are wound on the outer limbs.

8. A circuit for line and field deflection coils, said circuit comprising a line and field deflection current generator means for applying a substantially sawtooth current of line and field frequency and having a substantially constant peak-to-peak amplitude to said line and field deflection coils; respectively, a modulator means for generating a correction current for correcting astigmatic deflection errors, means coupled to said modulator means for applying said correction current to at least one of said deflection coils, and means for North-South raster correction comprising a selective network coupled to said modulator and means for integrating coupled between said network and said field deflection coil.

9. A circuit as claimed in claim 8 wherein said integrating means comprises said field deflection coil.

* * * * *